United States Patent [19]
Emblem

[11] 3,899,612
[45] Aug. 12, 1975

[54] METHOD OF PREPARING MOULDS FOR CASTING METALS

[75] Inventor: Harold Garton Emblem, Mirfield, England

[73] Assignee: Zirconal Processes Limited, Bromley, England

[22] Filed: Oct. 2, 1973

[21] Appl. No.: 402,785

[30] Foreign Application Priority Data
Aug. 1, 1973 United Kingdom............... 36641/73

[52] U.S. Cl. ............ 427/133; 106/38.2; 106/38.22; 164/26; 427/202; 427/343
[51] Int. Cl.² .......................................... B05D 1/38
[58] Field of Search.................... 117/5.1, 62.2, 33; 106/38.2, 38.22; 164/26, 25, 24, 23; 427/133, 343, 202

[56] References Cited
UNITED STATES PATENTS

| | | | |
|---|---|---|---|
| 3,494,997 | 2/1970 | Dittrich et al. .................. | 106/38.22 |
| 3,702,774 | 11/1972 | Birchall............................ | 106/38.22 |
| 3,748,157 | 7/1973 | Moore ................................ | 164/26 |
| 3,767,458 | 10/1973 | Moore ................................ | 164/26 |

Primary Examiner—William D. Martin
Assistant Examiner—Dennis C. Konopacki
Attorney, Agent, or Firm—Christensen, O'Connor, Garrison & Havelka

[57] ABSTRACT

A mould for casting metals is prepared by coating an expendable pattern with a composition comprising refractory powder dispersed in an aluminum hydroxyhalide solution. A coarse refractory is dusted on to the coating. The resulting coating is then hardened by contacting it with ammonia vapor.

3 Claims, No Drawings

METHOD OF PREPARING MOULDS FOR CASTING METALS

BACKGROUND OF THE INVENTION

This invention relates to the preparation of moulds for casting metals and alloys, particularly to the preparation of moulds which are used in the investment casting, or "lost wax" process. These moulds are prepared by applying to an expendable pattern made of wax, plastic or a low melting alloy at least one coating of a refractory powder suspended in a suitable binding agent.

SUMMARY OF THE INVENTION

According to the present invention there is provided a method of preparing a mould suitable for use in the casting of metals or alloys includes the step of coating an expendable pattern with a composition which is a finely divided refractory powder dispersed in an aqueous alcoholic solution of an aluminium hydroxyhalide of the general formula $Al_2(OH)_n X_{(6-n)} \cdot mH_2O$ or a polymer thereof, where $n$ is a number less than 6, $m$ is a number less than 4 and $x$ represents a chlorine, bromine or iodine atom, dusting a coarse refractory material on to the wet coating and then hardening the coating by the action of ammonia.

An important advantage of the present invention is that the binder does not contain silica. Therefore by suitable selection of the refractory materials, a mould which contains no silica can be prepared. This greatly reduces the possibility of metal-mould reactions during the casting of highly reactive alloys.

DETAILED DESCRIPTION OF THE INVENTION

In the preparation of moulds according to the invention a monolithic ceramic shell mould may be prepared by applying several coatings to the expendable pattern, with coarse refractory material being dusted on to each wet coating. Each coating is hardened with ammonia before the next coating is applied. Usually six to eight coatings and dustings are suitable.

Alternatively, a solid block mould may be prepared by first applying only one coating to the expendable pattern, dusting coarse refractory material on to the wet coating and hardening the coating by the action of ammonia, then surrounding the coated pattern with a slurry of a powdered refractory material in a suitable binding agent. British specification No. 753,228 gives a description of suitable refractory materials and binding agents.

The preferred aqueous alcoholic solution of an aluminium hydroxyhalide of the general formula $Al_2(OH)_n X_{(6-n)} mH_2O$ or a polymer thereof is prepared by dissolving 250 grams of solid aluminium chlorohydrate in 350 ml. of water and allowing the solution to stand for 24 hours before use. The aluminum chlorohydrate used is one in which $n$ is approximately 5 and $m$ is approximately 2. One volume of the resulting solution is diluted with one volume of ethyl alcohol, 64 O.P. I.M.S. The invention will be described in more detail with reference to this solution which is hereinafter referred to as "binder No. 3.". Example I describes methods for the production of a monolithic ceramic shell mould which does not contain silica.

EXAMPLE I

A coating composition was prepared by dispersing 400 g. of Alcoa calcined alumina A-2 grade, all passing 325 Tyler sieve, in 200 ml of binder No. 3. A ceramic shell mould was prepared as follows:

Stage I

Wax pattern dipped into coating composition and dusted with tabular alumina −28 + 48 Tyler mesh, then hardened by exposure to ammonia vapour.

Stages II – VI

As Stage I
The shell was left overnight for hardening and solvent evaporation to be complete. After removal of the wax pattern, the shell was fired to 1,400°C to remove residual organic material and mature the bond.

In the later stages a coarser tabular alumina grade may be used if desired.

EXAMPLE II

A coating composition was prepared by dispersing 800g. of zircon flour, all passing a 200 mesh B.S. 410 sieve in 200 ml of binder No. 3. A ceramic shell mould was prepared as follows.

Stage I

Wax pattern dipped into coating composition and dusted with zircon sand, all passing 60 mesh B.S. 410 sieve, then hardened by exposure to ammonia vapour.

Stage II

As Stage I

Stage III

As Stage I but dusted with −28 + 48 Tyler mesh tabular alumina.

Stage IV

As Stage I but dusted with −14 + 28 Tyler mesh tabular alumina.

Stage V

As Stage I but dusted with −8 + 14 Tyler mesh tabular alumina.

Stage VI

As Stage IV

Stage VII

As Stage III
The shell was left overnight for hardening and solvent evaporation to be completed. After removal of the wax pattern, the shell was fired to 1,400°C. to remove residual organic material and mature the bond.

Alternatively, tabular alumina −28 + 48 Tyler mesh may be used for all the dusting operations.

EXAMPLE III

A slurry was prepared by dispersing 820g. of zircon flour, all passing 200 mesh B.S. 410 sieve, in 200 ml of binder No. 3.

Ceramic shell moulds were prepared by dipping a wax pattern into the above coating slurry, dusting Molochite 16–30 grade powder on to the coated pattern, then hardening the coating by exposure to ammonia vapor. This sequence was repeated six times, giving a total of six dips and six dustings. The shells were left overnight for hardening and solvent evaporation to be completed. After removal of the wax pattern, the shells were fired to 1,400°C to remove residual organic material and mature the bond.

EXAMPLE IV

A slurry was prepared by dispersing 360g. of Molochite − 120 grade powder in 200 ml of binder No. 3 Ceramic shell moulds were prepared by dipping a wax pattern into the above coating slurry, dusting Molochite 16–30 powder on to the coated pattern, then hardening the coating by exposure to ammonia vapour. This sequence was repeated six times, giving a total of six dips and six dustings. The shells were left overnight for hardening and solvent evaporation to be completed. After removal of the wax pattern, the shells were fired to 1,400°C to remove residual organic material and mature the bond.

In Examples III and IV coarser grades of Molochite powder may be used after the second dusting with 16–30 material. For instance two dustings with 8–16 material and two dustings with ¼–8 material may be used. Alternatively, four dustings with 8–16 material may be used. However, it is preferred that all dustings are with 16–30 material.

Six coats and six dustings are convenient in that this enables a shell of satisfactory strength to be prepared rapidly. Less than six dustings may be adequate for a small casting, whereas a large casting may require as many as 12 dips and 12 dustings.

EXAMPLE V

A slurry was prepared by dispersing 120 grams of zircon flour, passing 200 mesh A.S.T.M. sieve in 30 grams of alumina binder No. 3. Ceramic shell moulds were prepared by dipping a wax pattern into the above coating slurry, dusting fused silica (Nalcast S–1) on to the coated pattern, then hardening by exposure to ammonia vapor. After 5 minutes standing, this sequence was repeated until four dips and four dustings had been applied. The coated pattern was now dipped in the slurry, dusted with fused silica (Nalcast S–2) then the coating was set by exposure to ammonia vapor. After 5 minutes standing, this sequence was repeated, giving a total of six dips and six dustings.

After standing for 2 hours, the shells were de-waxed by immersion in molten wax (wax temperature 190°C — the same wax as that used to make the wax patterns). After de-waxing, the shell was fired to 1,800°F to remove organic material.

EXAMPLE VI

A binder was prepared by dissolving 100 grams of aluminum bromohydrate in 140 ml of water and adding 134 ml of ethyl alcohol 64 O.P. industrial methylated spirit. The slurry was prepared by dispersing 800 g. of zircon flour, all passing 200 mesh B.S. 410 sieve, in 200 ml of the binder solution.

Ceramic shell moulds were prepared by dipping a wax pattern into the above coating slurry, dusting Molochite 16–30 grade powder on to the coated pattern, then hardening the coating by exposure to ammonia vapour. This sequence was repeated six times, giving a total of six dips and six dustings. The shells were left overnight for hardening and solvent evaporation to be completed. After removal of the wax pattern, the shells were fired to 1,400°C to remove residual organic material and mature the bond.

The aluminum bromohydrate used was made by Reheis Chemical Company, Chicago, Ill. U.S.A. the formula is $Al_2(OH)_5Br \cdot 2-3H_2O$. The product has Al:Br atomic ration 2.1 : 1 to 1.9 : 1.

The term 'aqueous alcoholic' used in the specification and claims includes any monohydric watermiscible alcohol, glycols, polyglycols and glycerols.

I claim:

1. A method of preparing a mould suitable for use in the casting of metals, such method including the steps of coating an expendable pattern with a composition consisting essentially of a finely divided refractory powder dispersed in an aqueous alcoholic solution of an aluminum hydroxyhalide of the general formula $Al_2(OH)_n X_{(6-n)} \cdot mH_2O$ or a polymer thereof, where $n$ is a number less than 6, $m$ is a number less than 4 and X represents a chlorine, bromine or iodine atom, dusting a coarse refractory material onto the wet coating and then hardening the coating by contacting it with ammonia vapor.

2. A method as claimed in claim 1 which includes a plurality of said steps successively carried out till the desired thickness of coating is achieved.

3. A method as claimed in claim 1 which includes the further step of surrounding the hardened coating with a slurry of powdered refractory material in a binding agent to thereby form a solid block mould.

* * * * *